4 Sheets—Sheet 1.

W. H. ORR.

Thrashing Machine.

No. 845. Reissued Nov. 1, 1859.

WITNESSES:
H. Carehart.
T. W. Berry.

INVENTOR:
W. H. Orr.

PETERS, Photo-Lithographer, Washington, D. C.

4 Sheets—Sheet 2.
W. H. ORR.
Thrashing Machine.
No. 845. Reissued Nov. 1, 1859.
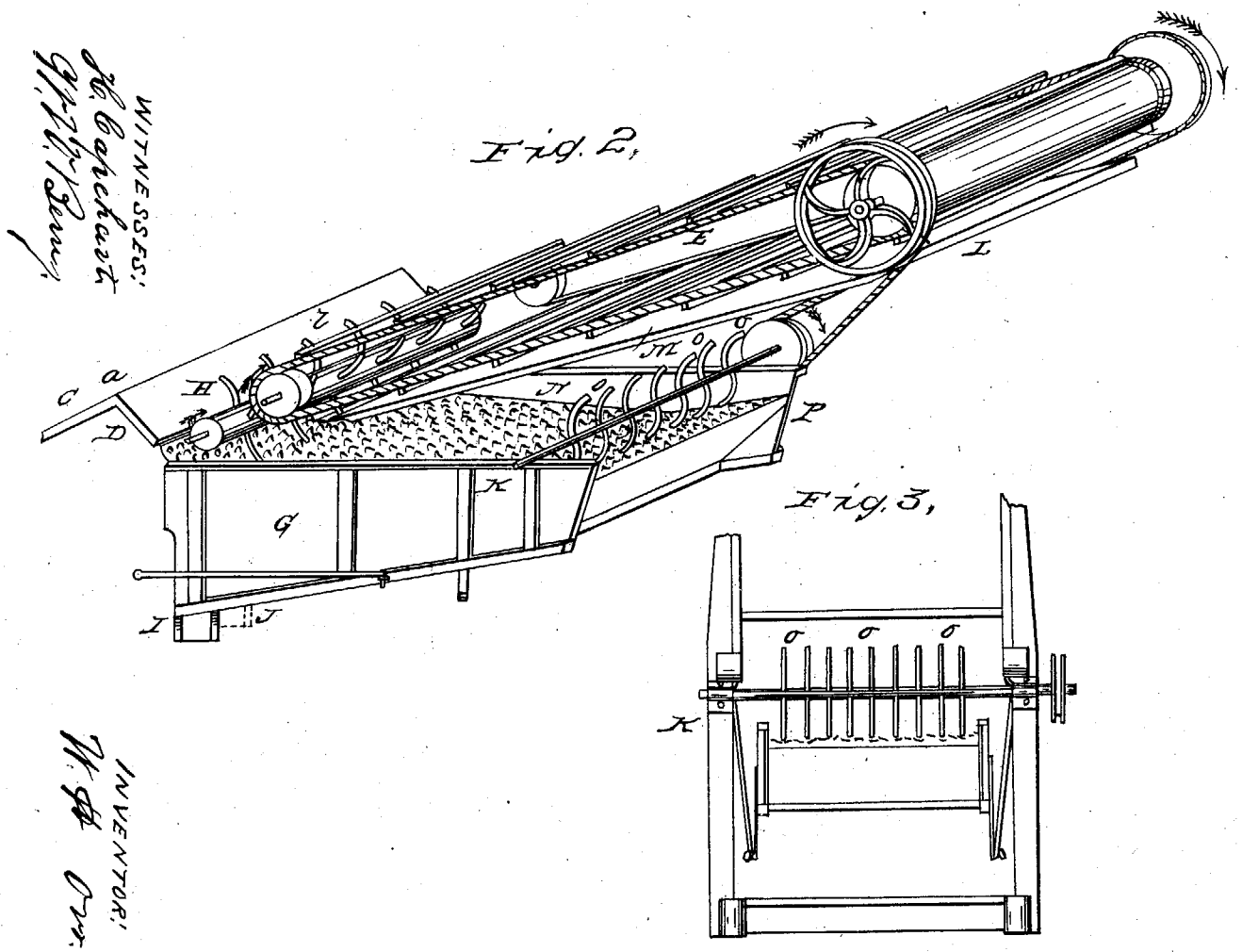
WITNESSES:
H. Capehart
W. W. Berry
INVENTOR:
W. H. Orr.
N. PETERS, Photo-Lithographer, Washington, D. C.

W. H. ORR.

4 Sheets—Sheet 3.

Thrashing Machine.

No. 845.

Reissued Nov. 1, 1859.

WITNESSES:
J. A. Capehart.
J. M. W. Berry.

INVENTOR:
W. H. Orr.

N. PETERS, Photo-Lithographer, Washington, D. C.

4 Sheets—Sheet 4.

W. H. ORR.

Thrashing Machine.

No. 845.

Reissued Nov. 1, 1859.

WITNESSES:
H. Capehart
W. W. Berry.

INVENTOR:
W. H. Orr.

N. PETERS, Photo-Lithographer, Washington, D. C.

UNITED STATES PATENT OFFICE.

WILLIAM M. GRIFFITH AND SYLVANUS MOORE, OF MARTIN'S FERRY, OHIO, ASSIGNEES OF WILLIAM H. ORR.

IMPROVEMENT IN MACHINES FOR CLEANING GRAIN.

Specification forming part of Letters Patent No. 20,923, dated July 13, 1858; Reissue No. 845, dated November 1, 1859.

*To all whom it may concern:*

Be it known that WILLIAM H. ORR, of Martin's Ferry, in the county of Belmont and State of Ohio, had invent a certain Improvement in Grain-Separating Machines; and we, WILLIAM M. GRIFFITH and SYLVANUS MOORE, doing business under the name, style, and firm of WILLIAM M. GRIFFITH & COMPANY, of Martin's Ferry, aforesaid, being the assignees of the whole right, title, and interest of the said WILLIAM H. ORR in and to the said invention, do hereby declare the following to be a full, clear, and exact description of the same, reference being had to the accompanying drawings, making part of this specification.

This improvement is particularly designed for what are known as "grain thrashing and separating machines," and consists in an automatic provision for loosening or stirring the obstructions liable to accumulate at the "tail" of the riddle, and which have heretofore had to be removed by human agency.

Figure 1:
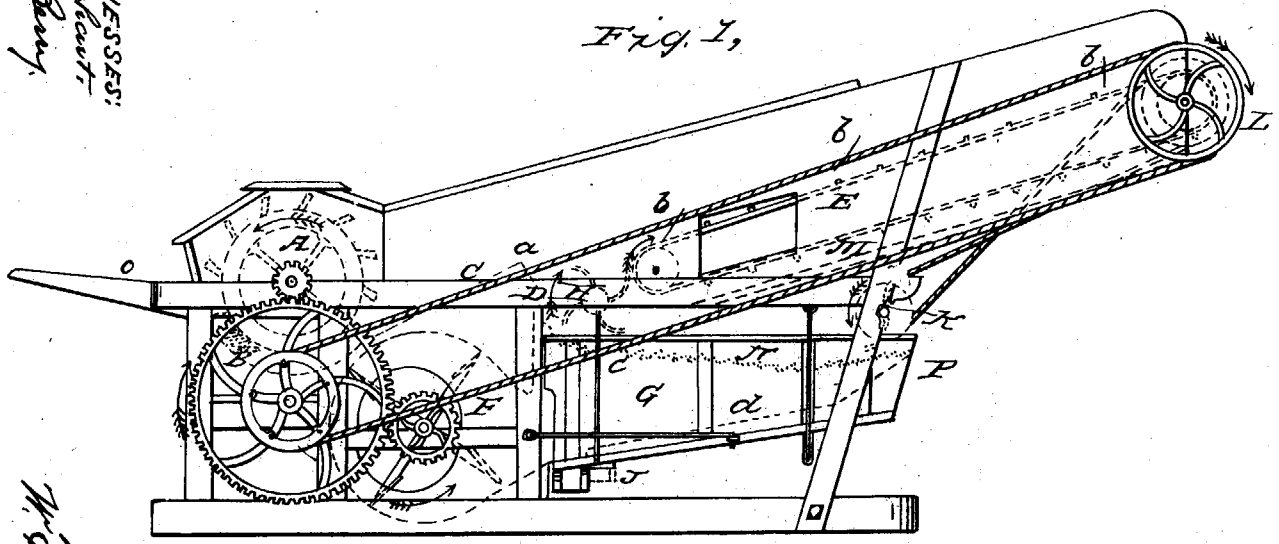
Figure 4:
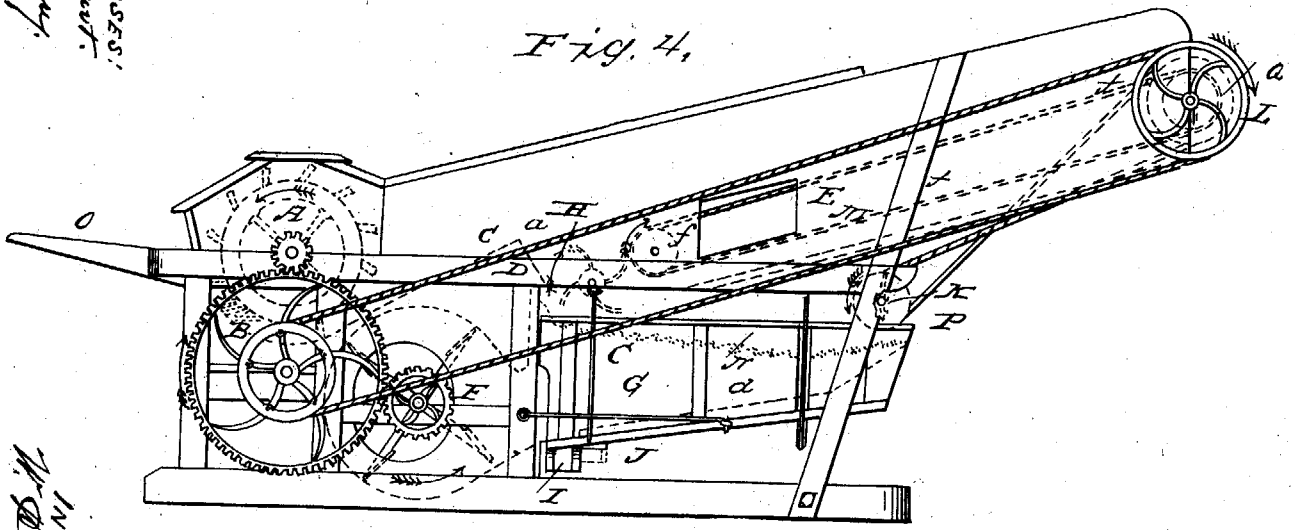
Figure 5:
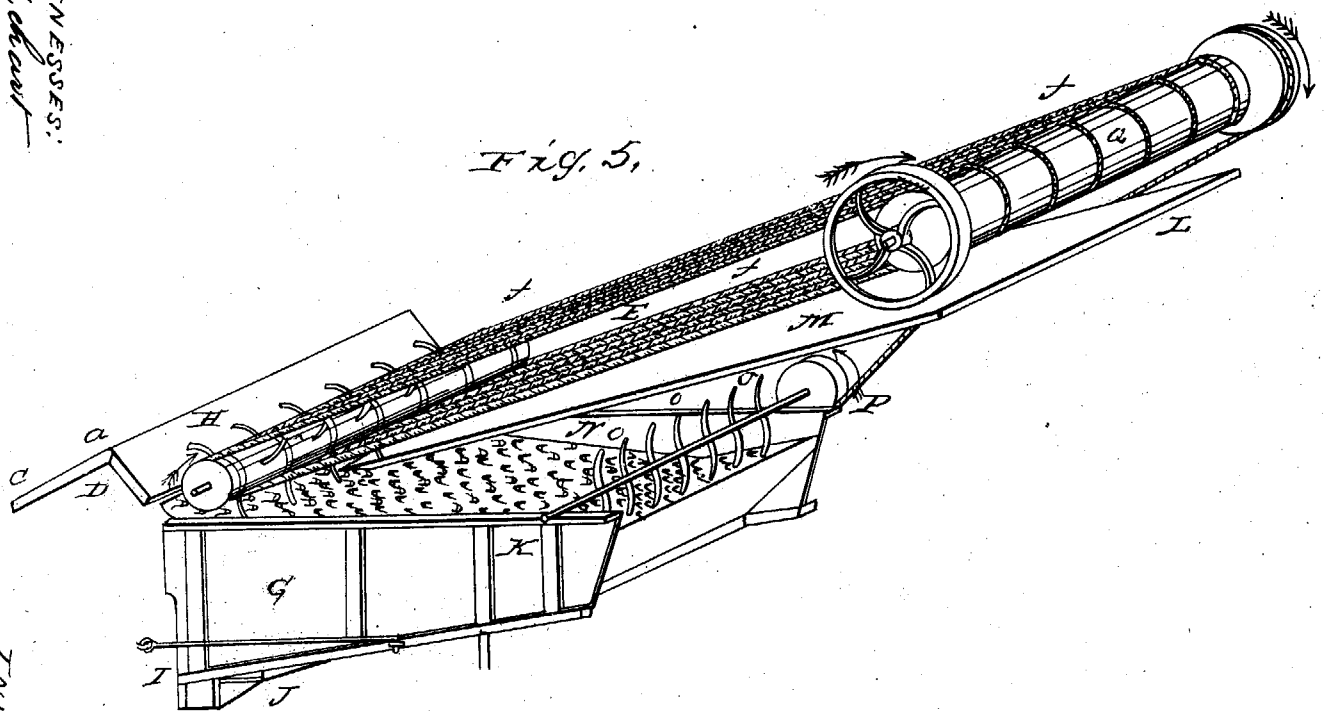

In the accompanying drawings, Figure 1 is a side elevation of a machine embodying the improvement. Fig. 2 is a perspective view of the chief operative parts of the same. Fig. 3 is an end elevation of the machine. Figs. 4 and 5, respectively, are a side elevation and a perspective view, exhibiting a slightly different arrangement of some parts from that exhibited in Figs. 1 and 2.

In this, as in many other machines used for a like purpose, the thrashing is effected by passing the unthrashed grain beneath a cylinder armed with teeth or spikes, and which is made to revolve above a fixed concave similarly armed. The straw, thrashed grain, &c., are by the thrashing-cylinder forcibly projected up the inclined chute C, whence the greater portion of the grain, on arriving at *a*, is by its gravity precipitated down the chute D, whence it falls upon a system of riddles, screens, &c., in the laterally-vibrating shoe G, where it is subjected to the blast from a fan, F. The straw, after arriving at the top of the chute C, is thrown upon the endless carrier E, which conveys it to the place of discharge, L. The carrier E is constructed of a series of straps or cords, *f*, stretched over grooved pulleys H Q, or the cords *f* may at their lower ends pass over independent pulleys H′. (Seen in Figs. 1 and 2.) When thus arranged, the straps or cords of the carrier E are provided with slats or bars (seen in Figs. 1 and 2) secured at right angles to said strap or cord. The spaces between the cords *f* in the former arrangement, and between the cords *f* and the slats C, in the latter arrangement, allow the grain which remains in the straw on its way to the place of discharge, L, to fall upon the inclined return bottom M, whence it is discharged upon the shoe G. The grain thus discharged, together with that separated from the straw at *a*, falling upon the laterally-vibrating shoe G at or near the point *c*, is subjected to the action of the blast from the fan F, and the greater portion of the grain, by the assistance derived from the shaking motion of the shoe, drops through the apertures or meshes into the riddle N and falls upon the screen *d*. Along this screen the grain is carried to the discharge spout I, while the smaller heavier impurities dropping through the meshes of the screen are carried on the inclined bottom of the shoe G into the screenings-spout J. The chaff and other light refuse are in the meantime, by the blast from the fan F, blown off at the surface of the riddle N in the direction of P.

In machines heretofore constructed in order to effect perfect separation, and to prevent a portion of the grain from being blown over with the chaff and lost, it has been the practice to extend the riddle N somewhat beyond the point at which the blast acts with a force sufficient to blow off all the chaff and other light substances. By this arrangement portions of the grain, according to their relative specific gravity, are carried along with the chaff and deposited at various points along the surface of the riddle, so that, in order to effect perfect separation, a considerable length of riddle is employed.

Under this arrangement the apertures near the tail of the riddle N have a tendency to become choked, which prevents the grain carried to that point from passing into the shoe G, and causes an accumulation of chaff and other extraneous matters, together with a portion of the grain, near the tail of the riddle N. This difficulty, in machines heretofore constructed, has been generally obviated by an attendant stirring with a stick the chaff which accumulates near the tail of the riddle, the effect being to loosen the matter thus accumulated, and by cleaning the meshes of the riddle to enable the blast to discharge the chaff over the tail of the riddle, and the grain to escape through the riddle into the screen *d*.

The act of loosening the accumulations on the tail of the riddle is performed in the present invention by means of a rake or stirrer, K, consisting of a shaft, *k*, from which project a series of teeth, *o*, either curved, as represented, or straight. This stirrer K is so suspended and revolved by a slow motion just above the tail of the riddle as for its teeth to catch and toss backward and upward whatever matters there accumulate, thus loosening them one from another, effectually clearing the meshes of the riddle N, and enabling the comparatively feeble blast which reaches this point to blow the chaff and other light refuse over the rear portion of the riddle, while the grain and heavier refuse are enabled to drop through the now open riddle onto the screen below.

It is obvious that the invention does not depend for its usefulness on any particular construction of stirrer, for the shape and movement of this stirrer may be varied as circumstances or preference may indicate, while retaining the essential features of the invention. For example, an endless-belt rake, or a rotary or vibratory reel, or other device might be employed, but it is proper to state that the form of stirrer K was selected for the present illustration after careful comparison and test of many forms, and is believed to be the best.

The essential feature of the invention is deemed to consist in the application and adaptation to a suitably-agitated riddle receiving chaff and grain, from which the major portion of the straw has been removed, of a stirrer, K, or its equivalent, adapted to so co-operate with the motion proper of the shoe as to disturb and loosen the chaff and other extraneous matters upon and at the part of the riddle where the unassisted blast is of itself too feeble to keep open the meshes of the riddle, the beneficial results of the improvement being that the apertures at the tail of the riddle are kept from choking, so as to permit the free passage of the residue of the grain, while the chaff and other lighter refuse, being kept in motion, are blown off over the tail of the riddle by the slight remaining blast which reaches that point.

When the grain is in good condition it is generally found preferable to rotate the stirrer in the direction indicated by the arrow in Figs. 1, 4, and 5, but when the chaff is in an unusually damp or matted state it may with advantage be rotated in the opposite direction, as indicated in Fig. 2. In either case a continuous rotary motion is found superior to a reciprocating.

We are aware that in Whitman's and other machines used for cleaning grain, rapidly-revolving beaters, placed over vibrating sieves or riddles and between the thrashing-cylinder and the endless straw-carrier, have been used for the purpose of beating and separating the straw and grain at the instant they leave the thrashing-cylinder, and also that such beaters have been employed to remove the greater portion of the chaff and other foreign matters from the sieve or riddle; therefore such beater, when so placed and used for the purpose of separating the remaining grain from the straw, &c., on leaving the thrashing-cylinder, we do not claim. Neither do we claim said beater when used for removing the greater portion of the chaff and other refuse from the riddle by throwing it up and carrying it off along with the straw of the endless carrier. Neither do we claim any peculiarity in the construction of the stirrer in itself considered; but

What we claim as new herein, and as the invention of the said WILLIAM H. ORR, is—

The arrangement and application of the stirrer K in the described relation to the riddle or shoe of a grain-separating machine, operating in the manner and for the purpose set forth.

In testimony of which, as the invention of the said WILLIAM H. ORR, we hereunto set our hands.

W. M. GRIFFITH,
SYLVANUS MOORE,
*Composing the firm of W. M. Griffith & Co.*

Witnesses:
A. C. QUARRIER,
W. B. QUARRIER.